US011944851B2

(12) United States Patent
Troutner et al.

(10) Patent No.: US 11,944,851 B2
(45) Date of Patent: Apr. 2, 2024

(54) HIGH-FILTRATION REUSABLE FACE MASK

(71) Applicant: Teal Bio, Inc., Somerville, MA (US)

(72) Inventors: Jason Troutner, Boston, MA (US); Nimeesh Rahate, Brighton, MA (US)

(73) Assignee: Teal Bio, Inc., Sommerville, MA (US)

( * ) Notice: Subject to any disclaimer, the term of this patent is extended or adjusted under 35 U.S.C. 154(b) by 0 days.

(21) Appl. No.: 17/729,366

(22) Filed: Apr. 26, 2022

(65) Prior Publication Data

US 2022/0339472 A1 Oct. 27, 2022

Related U.S. Application Data

(60) Provisional application No. 63/180,626, filed on Apr. 27, 2021.

(51) Int. Cl.
*A62B 18/08* (2006.01)
*A41D 13/11* (2006.01)
*A62B 23/02* (2006.01)

(52) U.S. Cl.
CPC .............. *A62B 18/08* (2013.01); *A41D 13/11* (2013.01); *A62B 23/02* (2013.01)

(58) Field of Classification Search
CPC ....... A62B 18/00; A62B 18/02; A62B 18/025; A62B 23/025; A62B 23/00; A62B 7/00; A62B 7/10; A62B 9/00; A62B 9/04; A62B 18/003; A62B 18/006; A62B 18/04; A62B 18/045; A62B 18/08; A61M 16/06; A61M 16/00; A61M 16/16; A41D 13/11; A41D 13/1107; A41D 13/115; A41D 13/1123; A41D 13/113; A41D 13/1138;

(Continued)

(56) References Cited

U.S. PATENT DOCUMENTS

2008/0223370 A1* 9/2008 Kim ...................... A41D 13/11 128/206.17
2017/0157435 A1 6/2017 Choi
(Continued)

FOREIGN PATENT DOCUMENTS

KR 200187059 Y1 6/2000
WO 2019008161 A1 1/2019

OTHER PUBLICATIONS

International Search Report and Written Opinion dated Jul. 27, 2022, directed to International Application No. PCT/US22/017919, 9 pages.

*Primary Examiner* — Michelle J Lee
*Assistant Examiner* — Robin Han
(74) *Attorney, Agent, or Firm* — MORRISON & FOERSTER LLP

(57) ABSTRACT

Provided are high-filtration reusable face masks with replaceable filters. Reusable face masks can comprise a single piece mask body configured to cover a nose and a mouth of a human face and comprising at least one filter attachment port, wherein the at least one filter attachment port comprises a filter support structure, defines an opening in the mask body, and extends from the exterior surface of the mask body; wherein the at least one filter attachment port is configured to connect to a replaceable filter and support the replaceable filter by separating portions of filter media of the replaceable filter when the replaceable filter is attached to the at least one filter attachment port.

19 Claims, 10 Drawing Sheets

(58) Field of Classification Search
CPC ............ A41D 13/1146; A41D 13/1161; A41D 13/1169; A41D 13/1176; A41D 13/1184; A41D 13/1192
See application file for complete search history.

(56) References Cited

U.S. PATENT DOCUMENTS

| | | | | |
|---|---|---|---|---|
| 2021/0346734 | A1* | 11/2021 | Newson | A62B 7/10 |
| 2021/0352977 | A1* | 11/2021 | Liu | A41D 13/1161 |
| 2022/0105371 | A1* | 4/2022 | Lee | A62B 25/00 |
| 2022/0184430 | A1* | 6/2022 | Hickey | A41D 13/1107 |
| 2022/0226678 | A1* | 7/2022 | Moran | A61L 9/20 |
| 2023/0074044 | A1* | 3/2023 | Grayson | A62B 23/025 |

* cited by examiner

HIGH-FILTRATION REUSABLE FACE MASK

CROSS-REFERENCE TO RELATED APPLICATIONS

This application claims priority from U.S. provisional application No. 63/180,626, filed Apr. 27, 2021, entitled "HIGH-FILTRATION REUSABLE FACE MASK," the content of which is incorporated by reference in its entirety.

FIELD

The present disclosure relates to reusable face masks, and more particularly, to reusable face masks having replaceable filters.

BACKGROUND

Conventional high-filtration face masks (e.g., N95 masks) include one-time use masks and reusable respirators with replaceable filters. High-filtration face masks filter out a majority of particles in the air, including infectious particles (e.g., viruses) when properly fitted to a user. Such face masks are commonly used in industry (e.g., mining, construction, painting) and healthcare. High-filtration face masks are also commonly used by people when in public places for protection from airborne diseases.

SUMMARY OF THE DISCLOSURE

Conventional high-filtration face masks are generally uncomfortable to wear for extended periods of time, particularly due to restricted breathability and reduced air flow as compared to that which is experienced without a face mask. Many high-filtration face masks also generate high amounts of waste. Further, conventional high-filtration face masks are opaque, which limits communication between the mask-wearer and another person due to the other person's inability to see the mask-wearer's facial expressions and mouth movements. Some conventional high-filtration respirators are more protective than typical one-time use high-filtration face masks; however, these respirators cannot be used in the healthcare field due to exhalation valves that break the sterile field and disinfection processes that are incompatible with healthcare systems.

Accordingly, high-filtration reusable masks provided herein may include increased air flow for improved breathability, may minimize waste, and/or may allow increased facial visibility of the mask-wearer to another person. Specifically, as described below, the reusable filters of the high-filtration reusable face mask described herein are designed to allow more air to pass through the filter with each inhale and exhale for improved breathability. The high-filtration face mask is reusable to reduce waste, and can be sterilized by autoclaving. In some embodiments, the filters are biodegradable, which can also reduce waste. Further, high-filtration reusable face masks described herein may be formed with a transparent polymer such that the body of the face mask is transparent. This can allow the mask-wearer to communicate effectively to another person, since the other person can see the mask-wearer's mouth through the transparent face mask body. In some embodiments, the high-filtration reusable face masks provided herein may be able to be used in healthcare settings, particularly since the replaceable filters of the high-filtration reusable face masks provided filter both incoming and outgoing air, and the reusable face masks provided can be sterilized with an autoclave, which is compatible with healthcare disinfection requirements.

In some embodiments, a high-filtration reusable face mask can include a mask body comprising one or more filter attachment ports to which the replaceable filters are configured to removeably attach. The one or more filter attachment ports extend from an exterior surface of the mask body and each include a filter support structure. The one or more filter attachment ports are configured to receive one or more replaceable filters (e.g., one replaceable filter per filter attachment port), such that the filter support structure of the filter attachment port causes the separation of two sheets of filter media of the replaceable filter to separate and the replaceable filter to assume an expanded configuration. By separating the two sheets of filter media of the replaceable filter, the replaceable filter can allow more air to enter and exit the filter with each inhale and exhale, respectively.

Each replaceable filter comprises two layers, or sheets, of filter media. The two sheets of filter media are attached along an outer edge. A support ring is attached to a rim of an opening in one sheet of filter media, and the support ring is configured to press and snap over the support structure of the filter attachment port. In some embodiments, the support structure protrudes into the opening of the one sheet of filter media and separates the two sheets of filter media by pushing the second sheet of filter media (without an opening) away from the first. In some embodiments, the support ring is configured to provide an airtight seal with the filter attachment port. After use, the filter is configured to snap off the support structure of the filter attachment port and be disposed.

In some embodiments, provided herein is a reusable face mask, the reusable face mask comprising: a single piece mask body configured to cover a nose and a mouth of a human face and comprising at least one filter attachment port, wherein the at least one filter attachment port comprises a filter support structure, defines an opening in the mask body, and extends from the exterior surface of the mask body; wherein the at least one filter attachment port is configured to connect to a replaceable filter and support the replaceable filter by separating portions of filter media of the replaceable filter when the replaceable filter is attached to the at least one filter attachment port.

In some embodiments of the reusable face mask, the filter support structure of the at least one filter attachment port comprises an upper base and a lower base and the filter attachment port comprises a proximal portion proximate to the exterior surface of the mask body and comprising an upper base and a lower base, wherein both the filter support structure and the proximal portion of the filter attachment port surround the opening in the mask body.

In some embodiments of the reusable face mask, the proximal portion and the filter support structure are different shapes.

In some embodiments of the reusable face mask, the proximal portion is cylindrical-shaped.

In some embodiments of the reusable face mask, the filter support structure is frustum-shaped.

In some embodiments of the reusable face mask, a height of the filter support structure, as measured from the lower base to the upper base along an axis passing through a center of the lower base and a center of the upper base of the filter support structure, is greater than a height of the proximal portion as measured from the upper base to the lower base along an axis passing through a center of the upper base and a center of the lower base of the proximal portion.

In some embodiments of the reusable face mask, the lower base of the filter support structure is in the shape of a rounded triangle.

In some embodiments of the reusable face mask, the lower base of the filter support structure extends past the upper base of the proximal portion, such that an edge of the lower base of the filter support structure forms a ledge that extends radially from the upper base of the proximal portion along a plane that is perpendicular to the height of the proximal portion and the filter support structure.

In some embodiments of the reusable face mask, the filter support structure comprises a sidewall connecting the lower base and the upper base, the sidewall comprising a plurality of openings.

In some embodiments of the reusable face mask, the mask body comprises a transparent polymer.

In some embodiments of the reusable face mask, the mask body comprises a polymer having a transmittance of 80% or greater.

In some embodiments of the reusable face mask, the mask body comprises one of silicone or thermoplastic polyurethane.

In some embodiments of the reusable face mask, the replaceable filter comprises a support ring and is configured to removeably attach to the at least one filter attachment port at the support ring.

In some embodiments of the reusable face mask, the first sheet of filter media and the second sheet of filter media are attached around an outer edge.

In some embodiments of the reusable face mask, the support ring is attached to a rim of an opening in the first sheet of filter media.

In some embodiments of the reusable face mask, when the replaceable filter is removably attached to the at least one filter attachment port, an inner surface of the support ring is in contact with a sidewall of the proximal portion of the at least one filter attachment port In some embodiments of the reusable face mask, when the replaceable filter is removably attached to the at least one filter attachment port, an airtight seal is formed between the support ring of the replaceable filter and a sidewall of the proximal portion of the at least one filter attachment port.

In some embodiments of the reusable face mask, the first sheet of filter media comprises a first layer of spunbond polypropylene, at least one layer of melt blown polypropylene, and a second layer of spunbond polypropylene.

In some embodiments of the reusable face mask, the second sheet of filter media comprises a first layer of spunbond polypropylene, at least one layer of melt blown polypropylene, and a second layer of spunbond polypropylene.

In some embodiments of the reusable face mask, the first sheet of filter media and the second sheet of filter media comprise a circular, square, rounded square, rectangle, rounded rectangle, triangle, rounded triangle, or oval shape.

In some embodiments of the reusable face mask, the support ring comprises one of polypropylene or polylactic acid.

In some embodiments of the reusable face mask, the replaceable filter is an N95 filter.

In some embodiments of the reusable face mask, the reusable mask comprises at least two attachment locations configured to receive a strap, the strap configured to wrap around a human head and hold the reusable face mask in place at the human face.

In some embodiments of the reusable face mask, the strap comprises silicone.

In some embodiments of the reusable face mask, the reusable face mask is configured to be sterilized with an autoclave.

In some embodiments, a replaceable filter for a reusable face mask is provided, the replaceable filter comprising: a first sheet of filter media; a second sheet of filter media attached to the first sheet of filter media around an outer edge; and a support ring attached to a rim of an opening in the first sheet of filter media, wherein the replaceable filter is configured to be removeably attached to a filter attachment port of a reusable face mask at the support ring, and the replaceable filter changes from a collapsed configuration to an expanded configuration when it is removeably attached to the filter attachment port.

In some embodiments of the replaceable filter, when the replaceable filter is removably attached to the at filter attachment port, an inner surface of the support ring is in contact with a sidewall of a proximal portion of the filter attachment port In some embodiments of the replaceable filter, when the replaceable filter is removably attached to the filter attachment port, an airtight seal is formed between the support ring of the replaceable filter and a sidewall of a proximal portion of the filter attachment port.

In some embodiments of the replaceable filter, the first sheet of filter media comprises a first layer of spunbond polypropylene, at least one layer of melt blown polypropylene, and a second layer of spunbond polypropylene.

In some embodiments of the replaceable filter, the second sheet of filter media comprises a first layer of spunbond polypropylene, at least one layer of melt blown polypropylene, and a second layer of spunbond polypropylene.

In some embodiments of the replaceable filter, the first sheet of filter media and the second sheet of filter media comprise a circular, square, rounded square, rectangle, rounded rectangle, triangle, rounded triangle, or oval shape.

In some embodiments of the replaceable filter, the support ring comprises one of polypropylene or polylactic acid.

In some embodiments of the replaceable filter, the replaceable filter is an N95 filter.

In some embodiments, any one or more of the features, characteristics, or elements discussed above with respect to any of the embodiments may be incorporated into any of the other embodiments mentioned above or described elsewhere herein.

BRIEF DESCRIPTION OF THE FIGURES

This application contains at least one drawing executed in color. Copies of this patent application with color drawing(s) will be provided to the Office upon request and payment of the necessary fee.

DETAILED DESCRIPTION OF THE DISCLOSURE

Figure 1:
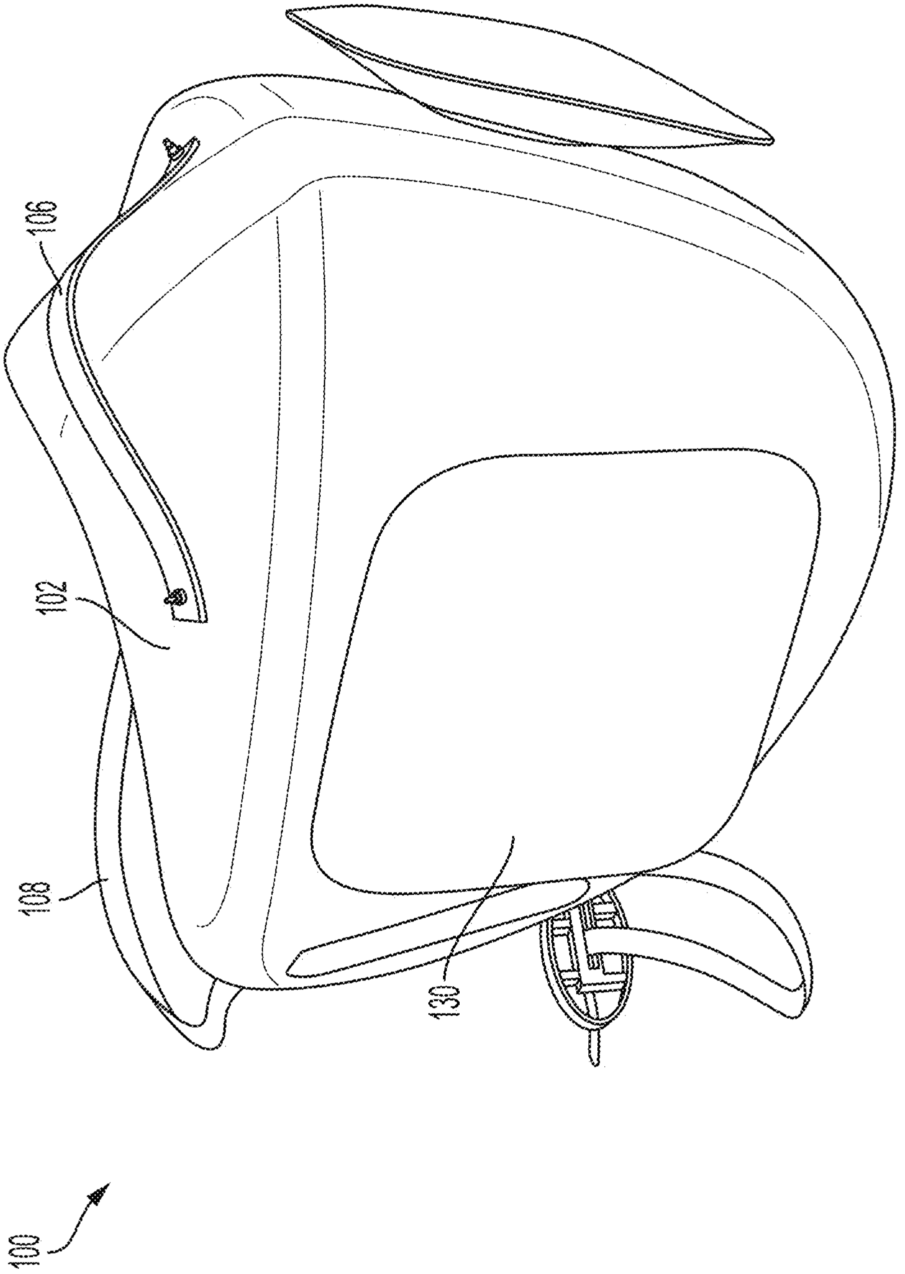
FIG. 1 shows a perspective view of a reusable face mask with two attached filters, a nosepiece, and a strap, according to some embodiments.

Described herein are high-filtration reusable face masks and replaceable filters for high-filtration reusable face masks. As described above, conventional high-filtration reusable face masks typically have low air flow and are uncomfortable for extended wear, generate excess waste, and limit communication between the mask-wearer and a second person due to inadequate facial visibility. The high-filtration reusable masks and replaceable filters provided can address any or all of these shortcomings of conventional face masks.

For example, the high-filtration face masks provided herein can provide increased air flow and breathability to the user as compared to that of conventional high-filtration face masks. Specifically, the design of the replaceable filter and mechanism for attaching the replaceable filter to the face mask body can allow more air to enter and exit the mask through the filter with each inhale and exhale.

Additionally, high-filtration face masks provided herein can decrease waste because they are reusable. The high-filtration reusable masks may be sterilized using an autoclave, or even just with some alcohol (e.g., isopropyl alcohol). Although the replaceable filters may only be one-time use filters, the replaceable filters may be biodegradable in some embodiments. A reusable face mask and/or biodegradable filters generate significantly less waste than that which is generated with conventional one-time use high-filtration masks and/or conventional respirators.

Further, high-filtration reusable face masks provided may also allow for increased communication between the mask-wearer and another. For example, in some embodiments, a transparent polymer may be used to form a transparent, or clear, mask body. With a transparent, or clear, mask body, another person can ascertain facial expressions from the mask-wearer as well as better understand the mask-wearer's verbal language, since he or she can see the mask-wearer's lips move as he or she speaks.

Additionally, in some embodiments, the high-filtration reusable masks provided herein can be used in healthcare settings. Currently, only single use high-filtration masks can be used in healthcare settings. Reusable respirators are incompatible with healthcare standards because they include an exhale valve that breaks the sterile field, and they cannot be sterilized using accepted healthcare practices. However, the replaceable filters for use with the high-filtration reusable masks provided herein do not break the sterile field when a user exhales; additionally, the reusable mask bodies can be sterilized using an autoclave, which is an acceptable healthcare sterilization method.

High-filtration reusable face masks provided include at least one filter attachment port having a filter support structure that can receive a replaceable filter configured to removeably attach to the filter attachment port. The filter attachment port receives the replaceable filter such that, when the filter is in place on the filter attachment port, the filter support structure of the filter attachment port physically separates two sheets of filter media of the replaceable filter. Separating the two sheets of filter media allows for more air flow into and out of the filters with each inhale and exhale.

Replaceable filters for high-filtration reusable masks include two sheets of filter media attached around an outer edge and a support ring. The support ring is attached to a rim of an opening within one sheet of the filter media. The support ring is configured to snap on to the support structure of the attachment port of a reusable face mask and form an airtight seal with the filter attachment port. Each sheet of filter media may comprise layers of spunbond polypropylene and/or melt-blown polypropylene. The sheets of filter media may be in any shape such as, but not limited to, a circle, a triangle, a rounded triangle, a square, a rounded square, an oval, a rhombus, or a rounded rhombus.

Described below are (1) high-filtration reusable face masks with reusable filter(s), (2) reusable face mask bodies (i.e., reusable face masks without the filter(s) attached), and (3) replaceable filters for use with the reusable face mask bodies described herein.

High-Filtration Reusable Face Masks with Replaceable Filters

Reusable face masks with replaceable filters are designed for increased air flow and breathability, to generate less waste, and for increased communication between the mask-wearer and another person. Each of these benefits of high-filtration reusable face masks with removably attached filters is described in detail below with respect to FIGS. 1 and 2A-2I.

FIG. 1 shows a perspective view of a high-filtration reusable face mask 100 with replaceable filters, according to some embodiments. As shown, face mask 100 includes face mask body 102, nosepiece 106, strap 108, and replaceable filter 130. Each feature is described in detail below.

Face mask body 102 is configured to cover a nose and a mouth of a human face. An interior surface of face mask body 102 faces and is in contact with the human face of the user, and an exterior surface of face mask body 102 is opposite the interior surface and faces outward and away from the user's face. The material, shape, and thickness of face mask body 102 is designed to provide a comfortable fit for the user, while at the same time providing a protective fit on the user's face. In some embodiments, face mask body 102 may provide an airtight seal with the user's face. The tighter the seal, the better protection the mask provides to the user.

In some embodiments, face mask body 102 may be made of a clear or transparent material. For example, suitable clear/transparent materials include elastomers such as silicone or thermoplastic polyurethane. In some embodiments, face mask body 102 may be made of a material having a transmittance of 60-100%, 70-100%, 80-100%, 85-100%, 90-100%, or 90-95%. In some embodiments, face mask body 102 may be made of a material having a transmittance of less than or equal to about 100, 95, 90, 85, 80, 75, 70, or 65%. In some embodiments, face mask body 102 may be made of a material having a transmittance of greater than or equal to about 60, 65, 70, 75, 80, 85, 90, or 95%. In some embodiments, face mask body 102 may be made of a material having a durometer of 40-60 or 45-55. In some embodiments, face mask body 102 may be made of a material having a durometer of less than or equal to about 60, about 55, about 50, or about 45. In some embodiments, face mask body 102 may be made of a material having a durometer of greater than or equal to about 40, about 45, about 50, or about 55. The durometer of the material is a Shore A durometer measured using CTM 0099 and press-cured for 5 minutes at 150° C. A suitable material for face mask body 102 may include DOW CORNING® C6-750.

In some embodiments, face mask body 102 may be made of an opaque material. In some embodiments, face mask body 102 may be made with a colorant, dye, or pigment to form a colored face mask body 102. In some embodiments, face mask body 102 may be made of a single piece. For example, face mask body 102 may be manufactured using injection molding to form a single-piece face mask body 102. In some embodiments, face mask body 102 is a single piece formed using a two-piece injection mold.

Nosepiece 106 comprises a relatively thin piece of metal attached to the exterior surface of face mask body 102. The position of nosepiece 106 can be adjacent to an upper edge of face mask body 102 and align with a location of the bridge of a user's nose. In some embodiments, nosepiece 106 is bendable to allow for a user to bend and mold the nosepiece 106 to create a personalized fit to the user's nose bridge. This can ensure a better fitting and more comfortable face mask, and thus more protective.

In some embodiments, nosepiece 106 comprises a metal such as aluminum, steel, stainless steel, or brass. In some embodiments, nosepiece 106 is connected to face mask body 102 by snapping onto one or more coupling protrusions. The one or more coupling protrusions are formed as part of the one-piece face mask body 102, and extend from the exterior surface of the face mask body 102. In some embodiments, the coupling protrusions comprise a distal portion and a proximal portion, the proximal portion connected to the face mask body 102. In some embodiments, the proximal portion is cylindrical in shape, and the distal portion extends radially such that the distal portion is slightly larger in a lateral direction than the proximal portion. Nosepiece 106 has at least one hole corresponding to each of the one or more coupling protrusions. The at least one hole is slightly smaller than the distal portion and slightly larger than a radius of the cylindrical proximal portion. Thus, when the nosepiece 106 attaches to the one or more coupling protrusions, the larger distal portion must squeeze to fit though the hole of nosepiece 106. The hole of nosepiece 106 snaps over the distal portion and rests comfortably around the proximal portion.

Strap 108 is configured to attach to face mask body 102 at two or more locations. At least one attachment location is at a right side of the face mask body 102, and at least one attachment location is at a left side of the face mask body 102, the left side corresponding to a left cheek of a user when wearing a mask, and the right side corresponding to a right cheek of a user when wearing the mask, the right side opposite the left side. Strap 108 is configured to wrap around the head of the user and help hold face mask body 102 in place to the user's face. In some embodiments, strap 108 may be adjustable (e.g., ties, sliding adjustable clips, etc.) In some embodiments, two straps 108 may be used to hold face mask body 102 to a user's face. In some embodiments, strap 108 is configured to clip to face mask body 102. Strap 108 may be made from materials such as elastic, cotton, silicone, or other suitable materials.

Face mask 100 is shown having two replaceable filters 130 each attached to a filter attachment port extending from the exterior surface of face mask body 102. Filter 130 comprises two sheets of filter media, attached at an outer edge. As shown in the figure, the two sheets of filter media are attached along the outer edge, following the rounded square outline. When unattached to a face mask body 102, filter 130 is in a collapsed, or flat configuration. When attached to a filter attachment port of a face mask body 102, filter 102 assumes an open, or expanded configuration. Filter 130 is caused to assume an expanded configuration due to the support structure of the filter attachment port. Filter attachment port is configured to receive filter 130 at an opening, such that the support structure of the filter attachment port extends into filter 130 and separates a portion of a first sheet of filter media from a portion of a second sheet of filter media.

Filter 130 may be in a rounded square shape, as shown. Other suitable shapes may include a circle, oval, square, triangle, rounded triangle, etc. Filter 130 may be configured to removably attach to face mask body 102, such that filter 130 may be replaced. Replacing filter 130 on a regular basis can help maintain optimal air flow, optimal filtration, and optimal protection from airborne particulates. In some embodiments, filter 130 may be a single-use filter.

Figure 2B:
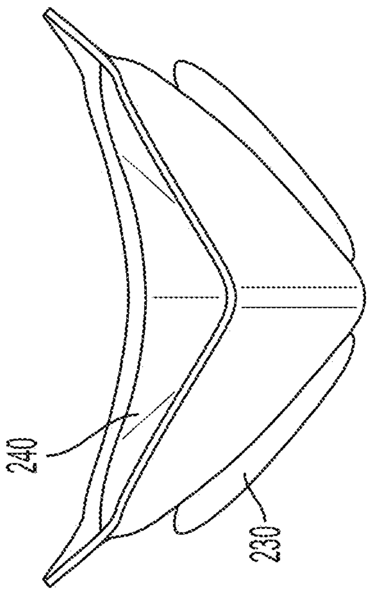
FIG. 2A-2I show various views of a reusable mask and filters, according to some embodiments.
Figure 2D:
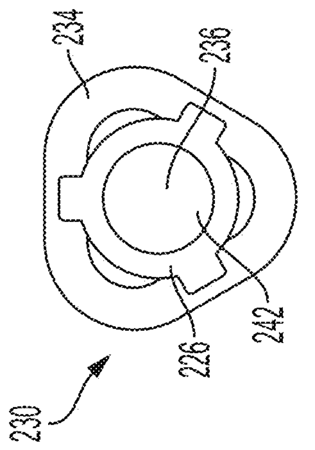
Figure 2A:
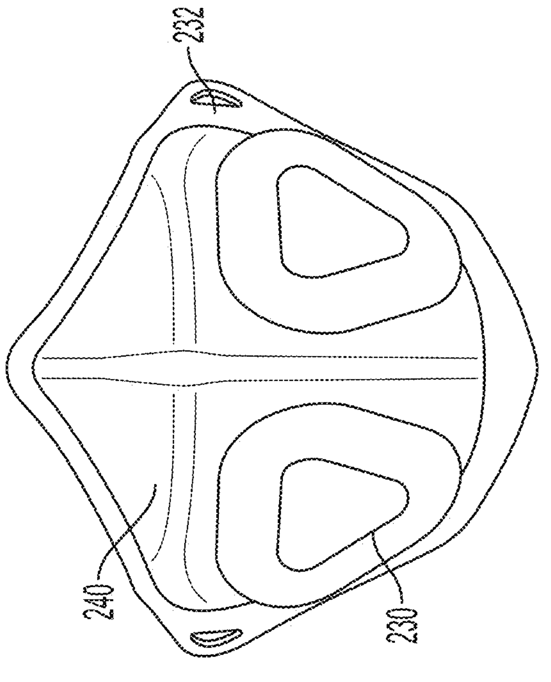
Figure 2C:
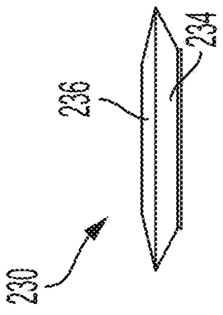
Figure 2E:
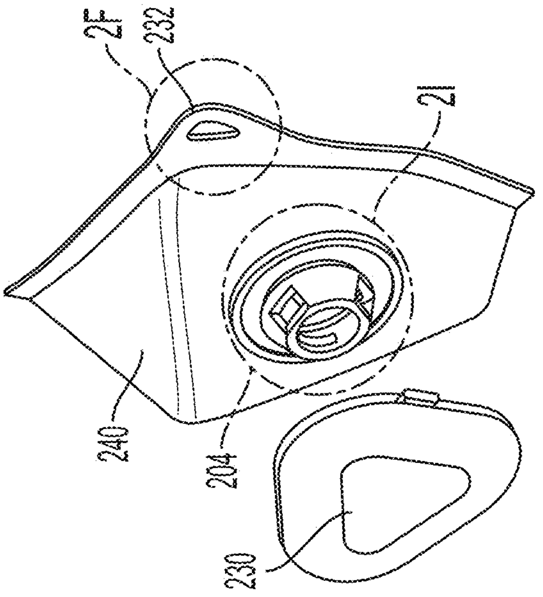
Figure 2F:
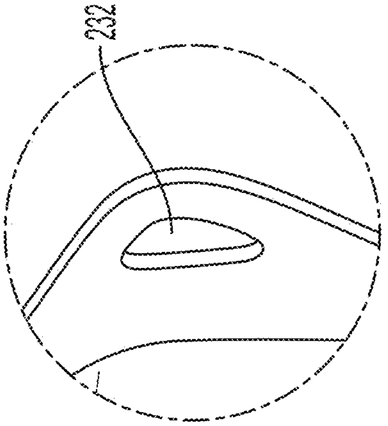
Figure 2G:
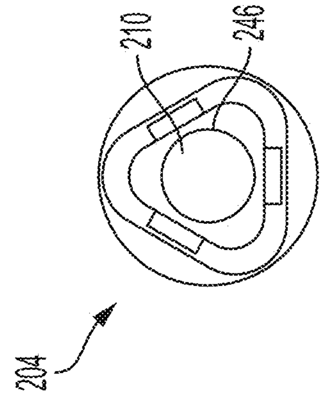
Figure 2H:
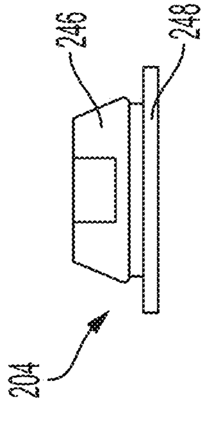
Figure 2I:
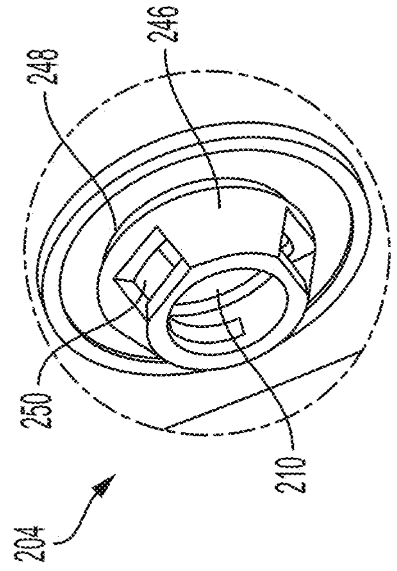

FIG. 2A-2I shows various views and components of a high-filtration reusable face mask, according to some embodiments. As shown, FIG. 2A shows a front view of a face mask having two replaceable filters, FIG. 2B shows a top view of a face mask having two replaceable filters, FIG. 2C shows a side view of a replaceable filter, FIG. 2D shows a rear view of a replaceable filter, FIG. 2E shows an exploded view of a face mask with a replaceable filter, FIG. 2F shows a close up view of a strap attachment location, FIG. 2G shows a close up front view of a filter attachment port, FIG. 2H shows a side view of a filter attachment port, and FIG. 2I shows a perspective view of a filter attachment port. Each figure is described in detail below.

FIG. 2A shows a front view of a face mask 240 having two replaceable filters, according to some embodiments. As shown, face mask 240 comprises two replaceable filters 230 and two strap attachment locations 232.

FIG. 2B shows a top view of a face mask 240 having two replaceable filters, according to some embodiments. In some embodiments, a thickness of face mask 240, as measured from the interior surface to the exterior surface, may be between about 0.5 and about 3 mm or between about 1 and about 2 mm. In some embodiments, a thickness of face mask 240 may be less than or equal to about 3, 2.8, 2.6, 2.4, 2.2, 2, 1.8, 1.6, 1.4, 1.2, 1, 0.8, or 0.6 mm. In some embodiments, a thickness of face mask 240 may be greater than or equal to about 0.5, 0.6, 0.8, 1, 1.2, 1.4, 1.6, 1.8, 2, 2.2, 2.4, 2.6, or 2.8 mm. If the thickness of face mask 240 is too thick, the mask will be uncomfortable to wear. If the thickness of face mask 240 is too thin, it will not have enough rigidity to form a protective seal with the face of the user. Additionally, face mask 240 may include any features of face mask 100 as described with respect to FIG. 1.

FIG. 2C shows a side view of a filter 230, according to some embodiments. Filter 230 includes a first sheet of filter media 234 and a second sheet of filter media 236. As shown, when filter 230 is not attached to a face mask, it is in a collapsed, or flat configuration. The first sheet of filter media 234 is attached to the second sheet of filter media 236 at an outer edge. Between the outer edges of filter 230, first sheet of filter media 234 and second sheet of filter media 236 are not attached.

FIG. 2D shows a rear view of a filter 230, according to some embodiments. Specifically, filter 230 of FIG. 2D shows the second sheet of filter media 236, opening 242 through the second sheet of filter media 236, interior surface of first sheet of filter media 234, and support ring 226.

When attached to a face mask, second sheet of filter media 236 is configured to face the exterior surface of the face mask. As shown, an opening 242 is formed through the first sheet of filter media 234, which is configured to receive a support structure of a filter attachment port of a face mask body. The support structure of a filter attachment port can extend into the filter 230 and press against interior surface of second sheet of filter media 236. By pressing against interior surface of second sheet of filter media 236, filter 230 changes from a flat, collapsed configuration to an expanded, or open configuration. In the expanded, or open, configuration, the support structure of the filter attachment port separates a portion of the second sheet of filter media 236 from a portion of the first sheet of filter media 234. In the configuration, the two sheets of filter media remain attached to each other at the outer edge. However, the separation increases the interior volume of filter 230, allowing more air to enter and exit filter 230 (i.e., through the first sheet of filter media 234 or the second sheet of filter media 236) and increasing the breathability of the face mask for the user.

Opening 242 may have a diameter of about 10-40 mm, 15-35 mm, or 20-30 mm. In some embodiments, opening 242 may have a diameter of less than or equal to about 40, 35, 30, 25, 20, or 15 mm. In some embodiments, opening 242 may have a diameter of greater than or equal to about 10, 15, 20, 25, 30, or 35 mm.

Support ring 226 may be attached to a rim of opening 242. Support ring is configured to provide support for filter 230 and to connect to the filter attachment port of the face mask body. In some embodiments, an inner surface of support ring 226 may be configured to provide a seal with the filter attachment port of the face mask body. In some embodiments, an inner surface of support ring 226 may be configured to provide an airtight seal with the filter attachment port of the face mask body. Support ring 226 may comprise a rigid polymer, such as polypropylene or polylactic acid. In some embodiments, support ring 226 may be biodegradable (e.g., polylactic acid). In some embodiments, support ring 226 may have an inner diameter (i.e., diameter of the opening of support ring 226) of 15-40 mm, 20-35 mm, or 25-30 mm. In some embodiments, support ring 226 may have an inner diameter of less than or equal to about 40, about 35, about 40, about 25, or about 20 mm. In some embodiments, support ring 226 may have an inner diameter of greater than or equal to about 15, about 20, about 25, about 30, or about 35 mm.

FIG. 2E shows an exploded view of a side view of a face mask 240 with filter 230, according to some embodiments. Specifically, FIG. 2E shows face mask 240 comprising an attachment location 232 for a strap and a filter attachment port 204. Attachment location 232 is described in more detail with respect to FIG. 2F, and filter attachment port 204 is described in more detail with respect to FIGS. 2G-2I.

FIG. 2F shows a close up view of a strap attachment location 232, according to some embodiments. A face mask according to some embodiments may comprise two strap attachment locations 232, one on each side of the face mask. Specifically, a first strap attachment location 232 may be located on a right side of the face mask body (e.g., corresponding to a location of a right cheek of a user) and a second strap attachment location 232 may be located on a left side of the face mask body (e.g., corresponding to a location of a left cheek of a user). In some embodiments, a face mask body may comprise four or more strap attachment locations 232. In some embodiments, a strap attachment location 232 may be configured to receive a strap by tying (i.e., tying the strap to the strap attachment location). In some embodiments, a strap attachment location 232 may be configured to receive a strap by clipping (i.e., the strap clips to the strap attachment location 232).

FIG. 2G shows a close up front view of a filter attachment port 204, according to some embodiments. As shown, filter attachment port 204 includes a central opening 210 and distal portion 246. In some embodiments, distal portion 246 comprises a support structure. Filter attachment port 204 extends from an exterior surface of a face mask body and, when a filter is attached to filter attachment port 204, a support structure (e.g., distal portion 246) of filter attachment port 204 extends into the filter. Thus, central opening 210 of filter attachment port 204 is configured to allow air flow to and from an exterior environment of a filter and the user's nose and mouth. Central opening 210 extends through a proximal portion and a distal portion 246 of filter attachment port 204. The proximal portion is attached to the face mask body. The distal portion 246 is attached to the proximal portion. In some embodiments, distal portion 246 is in the shape of a frustum and has a lower base and an upper base, the lower base being greater in surface area than the upper base. In some embodiments, the upper base and/or the lower base of the frustum-shaped distal portion 246 may be circular, triangular, or in the shape of a rounded triangle. In some embodiments, the lower base of the distal portion 246 may be larger than and extend radially outwards past an upper base of the proximal portion, forming a ledge. In some embodiments, the proximal portion comprises an indentation configured to receive the support ring of a replaceable filter. In some embodiments, a width of the support structure (i.e., distal portion 246) may be 15-40 mm, 20-35 mm, or 25-30 mm. In some embodiments, a width of the support structure may be less than or equal to about 40, about 35, about 40, about 25, or about 20 mm. In some embodiments, a width of the support structure may be greater than or equal to about 15, about 20, about 25, about 30, or about 35 mm.

When a filter is attached to filter attachment port 204, the support ring of the filter is pushed over the distal portion 246, such that distal portion 246 may deform or contract to allow the support ring to snap/fit over. When properly attached to the filter attachment port 204, the support ring sits surrounding the proximal portion of the filter attachment port 204, and an interior surface of a second sheet of filter media rests against the upper base of the distal portion 246 of filter attachment port 204. The filter may be removed from filter attachment port 204 by pulling the support ring of the filter off the distal portion of the filter attachment port 204. In some embodiments, a replaceable filter is configured to lock or attach to the proximal portion of the filter attachment port 204 and the distal portion 246 of the attachment port 204.

In some embodiments, a face mask body may comprise 1, 2, 3, 4, 5, 6, 7, or 8 filter attachment ports. In some embodiments, a filter attachment port is configured to receive a single filter. In some embodiments, a filter attachment port is configured to receive two or more filters.

FIG. 2H shows a side view of a filter attachment port 204, according to some embodiments. As shown, FIG. 2H shows distal portion 246 (e.g., support structure) and proximal portion 248 of filter attachment port 204. The face mask body may be manufactured as a single piece, including the filter attachment port(s).

As described above, filter attachment port 204 comprises a distal portion 246 attached to a proximal portion 248, which is adjacent to the face mask body. In some embodiments, proximal portion 248 may be cylindrical and have an upper base and a lower base. In some embodiments, the distal portion may be frustum-shaped and have an upper base and a lower base. The lower base of the cylindrical proximal portion 248 may be adjacent to the face mask body exterior surface, and the upper base of the cylindrical proximal portion 248 may be adjacent to the lower base of the frustum-shaped distal portion 246. As described above, when a filter is connected to the filter attachment port 204, an inner surface of the support ring of the filter rests against and is in contact with a sidewall surface of proximal portion 248. Thus, the radius of cylindrical proximal portion 248 is slightly smaller than the inner radius of the support ring of a filter. In some embodiments, proximal portion 248 may comprise an indentation to allow for the support ring of a filter to attach to the filter attachment port 204.

As shown, the lower base of distal portion 246 is slightly larger than the upper base of cylindrical proximal portion 248. For example, lower base of frustum-shaped distal portion 246 may extend radially past an outer edge of the upper base of cylindrical proximal portion 248, creating a ledge or ridge. In some embodiments, proximal portion 248 may comprise an indentation, such that proximal portion 248 is smaller than distal portion 246.

FIG. 2I shows a perspective view of a filter attachment port 204, according to some embodiments. Filter attachment port 204 includes proximal portion 248, distal portion 246, central opening 210, and side openings 250.

As described above, filter attachment port 204 is configured to receive a filter such that, when the filter is attached to the mask body, it assumes an expanded configuration due to a support structure (e.g., distal portion 246) of the filter attachment port separating a portion of the two sheets of filter media of the filter. Specifically, one sheet of filter media sits against the upper base of the frustum-shaped distal portion 246, and another sheet of filter media is attached to the support ring, which surrounds the cylindrical proximal portion 248 of the filter attachment port 204. Thus, when the filter is connected to the filter attachment port 204, the entire distal portion 246 is positioned within the filter.

Central opening 210 and side openings 250 are configured to allow air to pass between an exterior environment of the filter and the nose and mouth of the user. Larger openings and more openings in number correspond to greater air flow and thus, greater breathability and comfort for the user. In some embodiments, a filter attachment port 204 may comprise 1, 2, 3, 4, 5, 6, 7, or 8 side openings 250.

Reusable Face Mask Bodies

As explained above, conventional high-filtration face masks are uncomfortable to wear for extended periods due to low air flow, generate high amounts of waste, and restrict communication between a mask-wearer and another person. However, as described with respect to the figures below, the face mask bodies provided are more comfortable to wear over extended periods of time, are reusable and thus generate considerably less waste, and can be clear, which can enable better communication between the mask-wearer and another person. These features are described with respect to FIGS. 3 and 4 below.

Figure 3:
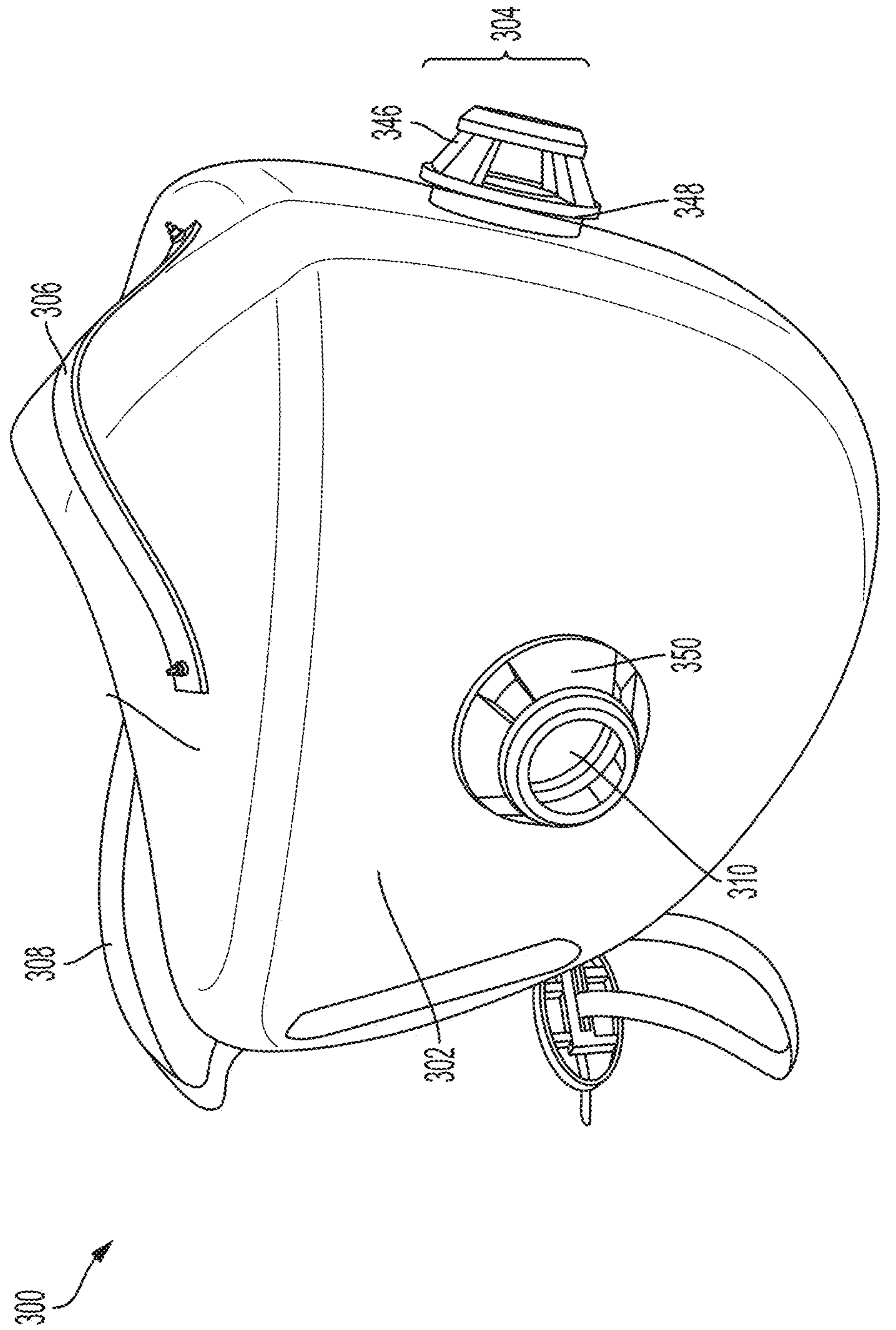
FIG. 3 shows a perspective view of a reusable face mask body with a nosepiece and a strap, according to some embodiments.

FIG. 3 shows a perspective view of a face mask 300, according to some embodiments. As shown, face mask 300 can include the face mask body 302, attachment port 304, nosepiece 306, and strap 308. Each feature is described in detail below.

Face mask body 302 is designed to cover a nose and a mouth of a user. Face mask body 302 may include any features of any other face mask bodies described throughout this disclosure.

As described above with respect to face mask body 102 of FIG. 1, face mask body 302 may be manufactured as a single piece. For example, face mask body 302 may be manufactured using a two-piece injection mold. Additionally, face mask body 302 may be made of a clear material such as silicone or thermoplastic polyurethane. In some embodiments, face mask body 302 may be made using colorants, dyes, or pigments to achieve a specific colored face mask body 302. Additionally, the thickness of face mask body 302 is designed to balance comfort for the wearer and proper fit. If the face mask body is too thick, it may not be comfortable for extended wear. If the face mask body is too thin, it may not provide an adequate seal to the wearer's face for optimal protection.

Filter attachment port 304 may include any features of any other filter attachment ports described within this disclosure. As shown, filter attachment port 304 extends from an exterior surface of face mask body 302 and comprises a support structure, defining a central opening. Filter attachment port 304 also comprises a proximal portion 348 and a distal portion 346 (e.g., support structure). Along a side of the distal portion 346 are a number of side openings 350. The openings allow air to pass between the user's nose and mouth and the filter media surfaces.

Nosepiece 306 is attached to the exterior surface of face mask body 302. As shown, nosepiece 306 is attached at a location that corresponds to the bridge of a user's nose. The nosepiece 306 may be deformed or manipulated by a user to form a tight, personalized fit to the user's face, increasing the comfort and the adequacy of the seal of the face mask body to the user's face. In some embodiments, the nosepiece 306 may be made of a material such as aluminum, steel, stainless steel, or brass. In some embodiments, nosepiece 306 may be removably attached to the face mask body 302. In some embodiments, nosepiece 306 may be permanently attached to the face mask body 302. In some embodiments, nosepiece 306 may include one or more holes corresponding to one or more protrusions extending from the exterior surface of the face mask body 302. The protrusions may be part of the single-piece face mask body 302. In some embodiments, nosepiece 306 may be configured to pop or snap onto the coupling protrusion(s) of face mask body 302 to attach to the face mask body 302.

Strap 308 is configured to wrap around the user's head to hold the face mask 300 in place at a user's face. Strap 308 may be configured to attach at one or more strap attachment locations on a face mask body. In some embodiments, strap 308 may be configured to tie to a strap attachment location. In some embodiments, strap 308 may be configured to clip to a strap attachment location. In some embodiments, a face mask body may comprise two, four, or six strap attachment locations. In some embodiments, a face mask 300 may comprise one strap. In some embodiments, a face mask 300 may comprise two or more straps. In some embodiments, strap 308 may comprise silicone, elastic, cotton, or other suitable materials.

Figure 4:
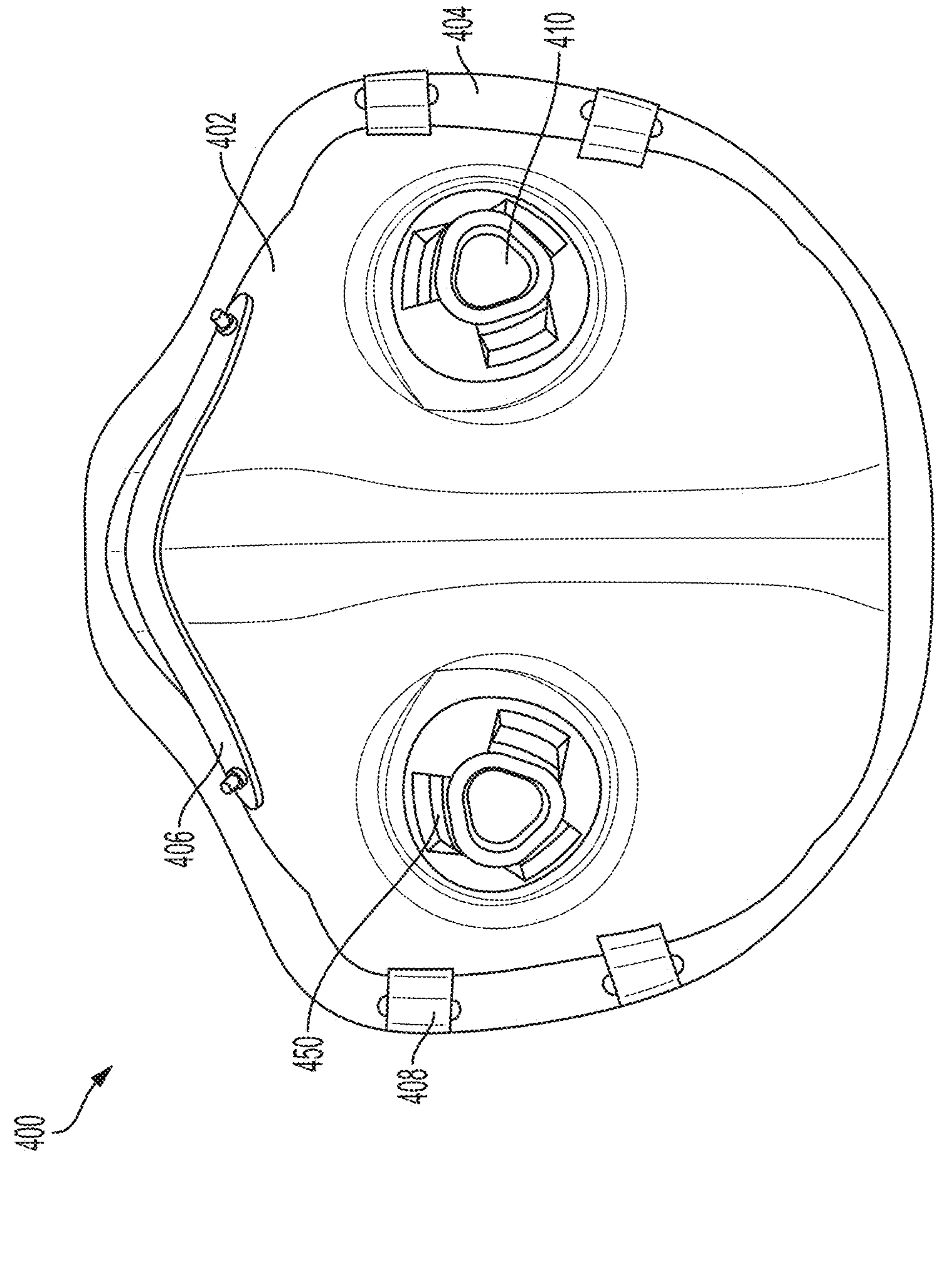
FIG. 4 shows a front view of a reusable face mask body with a nosepiece, according to some embodiments.

FIG. 4 shows a front view of a face mask 400, according to some embodiments. As shown, face mask 400 includes face mask body 402, attachment port 404, nosepiece 406, and strap 408. Attachment port 404 includes central opening 410 and side openings 450. Each feature is described in detail below.

Face mask body 402 comprises an exterior surface (facing away from the user) and an interior surface (adjacent to a user's face). Face mask body 402 comprises a contoured shape configured to fit a human face. In some embodiments, the face mask body 402 may be configured to fit an adult face. In some embodiments, the face mask body 402 may be configured to fit a child's face.

Filter attachment port 404 extends from an exterior surface of face mask body 402 and comprises a central opening 410 and one or more side openings 450. Filter attachment port 404 is configured to receive and hold a filter to the face mask body 402, as described in detail above.

Nosepiece 406 is attached to an exterior surface of face mask body 402, and is configured to allow a user to mold a portion of the face mask body 402 to the user's face (e.g., the user's nose bridge) for a more comfortable and protective fit.

Strap 408 is attached to one or more strap attachment locations positioned at a side edge of face mask body 402.

Replaceable Filters for Reusable Face Mask Body

Filters for use with the reusable face mask bodies provided herein are designed for increased air flow and breathability. This can increase the comfort for a user, and allow the user to comfortably wear the mask for longer periods of time than that of a conventional face mask. Additionally, the filters can comprise biodegradable filter media, lessening the amount of waste generated.

Additionally, the filters for use with the reusable face masks described herein can be simpler to manufacture, easier to store, and easier to transport than filters and/or cartridges of conventional respirators/masks. Specifically, the filters described herein are flat, or in a compressed configuration when they are not attached to a face mask body. Because they assume a flat configuration, the filters take up less space when stored and transported. Thus, it is easier and less expensive to store and transport the filters than filters/cartridges of conventional reusable masks/respirators. Below, filters according to embodiments provided herein are described with respect to FIGS. 5A, 5B, 6, and 7.

Figure 5B:
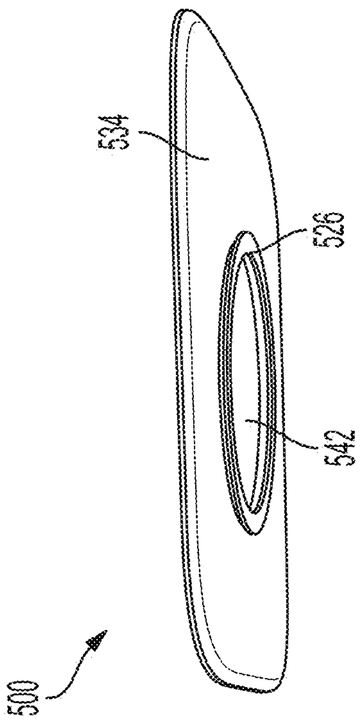
FIGS. 5A and 5B show two separate views of a filter, according to some embodiments.
Figure 5A:
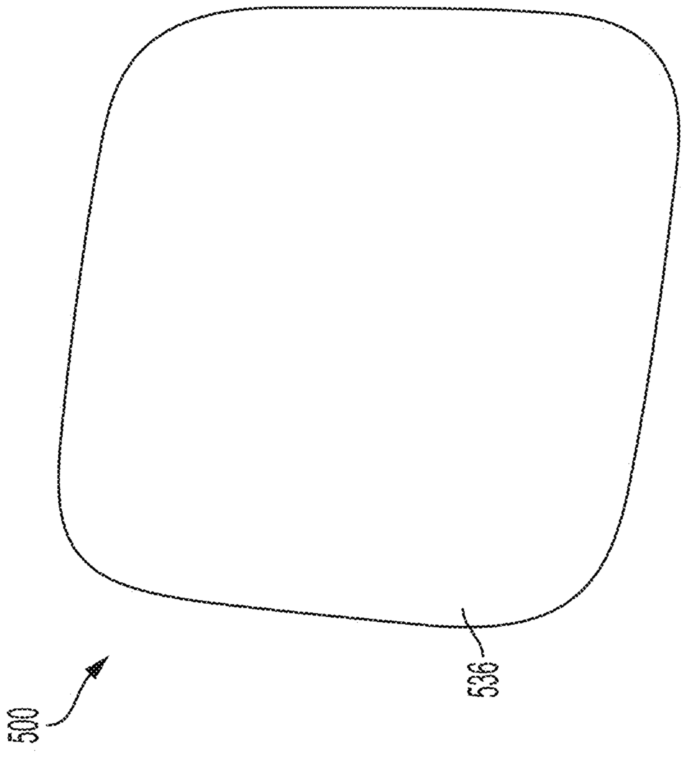

FIGS. 5A and 5B show different views of a filter 500, according to some embodiments. Specifically, FIG. 5A shows an outer surface of a filter, or the surface that is visible from an exterior view of the mask, when the filter is attached to a mask body. FIG. 5B shows a view of an inner surface of a filter 500, or the surface which faces the mask body when the filter is attached to the mask body. FIG. 5A shows an outer sheet of filter media 536 (also referred to as a second sheet of filter media). FIG. 5B includes a first sheet of filter media 534, a second sheet of filter media 536, an opening 542, and a support ring 526.

Filter 500 may achieve any of the following levels of filtration: N95, N99, N100, R95, P95, P99, P100, KN95, or the like.

First sheet of filter media 534 and second sheet of filter media 536 can each comprise a plurality of layers. In some embodiments, each sheet of filter media may comprise one or more layers of polypropylene, wool, and/or polylactic acid. Suitable types of polypropylene can include spunbond polypropylene and/or melt-blown polypropylene. In some embodiments, first sheet of filter media 534 and/or second sheet of filter media 536 comprise a first layer of spunbond polypropylene, one or more layers of melt-blown polypropylene overlying the first layer of spunbond polypropylene, and a second layer of spunbond polypropylene overlying the one or more layers of melt-blown polypropylene. In some embodiments, first sheet of filter media 534 and/or second sheet of filter media 536 can comprise 1, 2, 3, 4, 5, 6, 7, 8, 9, or 10 layers of filter material. In some embodiments, first sheet of filter media 534 and second sheet of filter media 536 comprise the same number of layers of filter material. In some embodiments, first sheet of filter media 534 and second sheet of filter media 536 comprise a different number of layers of filter material.

First sheet of filter media 534 may be attached to second sheet of filter media 536 around the outer edge. In some embodiments, first sheet of filter media 534 and second sheet of filter media 536 are the same size and shape.

In some embodiments, filter 500 may comprise an opening 542 in one sheet of filter media. As shown, opening 542 is located within first sheet of filter media 534. Opening 542 is configured to receive a support structure or a distal portion of a filter attachment port.

Support ring 526 may be connected to opening 542. For example, support rung 526 may be connected at a rim of opening 542. Support ring 526 is configured to provide support for filter 500 and to connect filter 500 to a reusable mask at a filter attachment port. In some embodiments, support ring 526 is configured to provide an airtight seal with a filter attachment port of a mask body. In some embodiments, support ring 526 may comprise polypropylene or polylactic acid.

Figure 6:
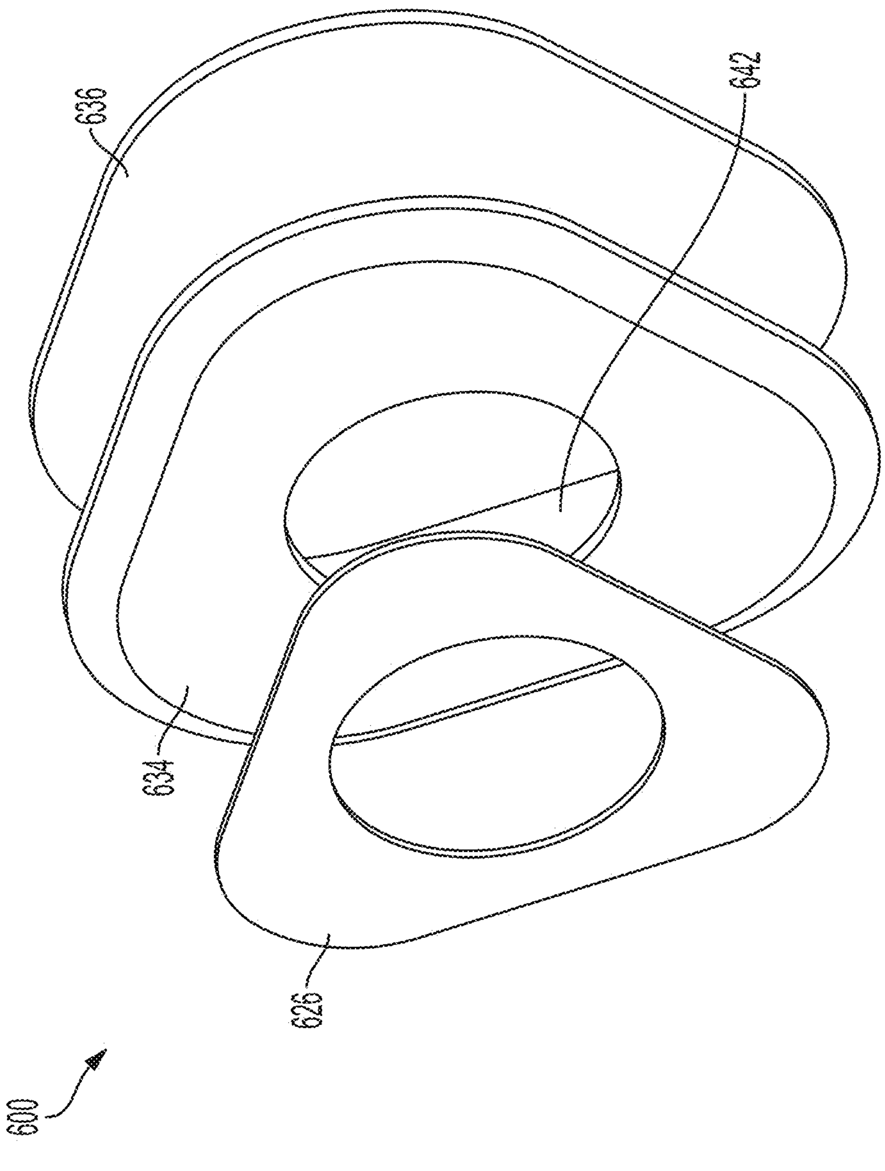
FIG. 6 shows an exploded view of a filter, according to some embodiments.

FIG. 6 shows an exploded view of a filter 600, according to some embodiments. As shown, filter 600 includes support ring 626, first sheet of filter media 634, second sheet of filter media 636, and opening 642.

As described above, first sheet of filter media 634 and second sheet of filter media 636 are attached to each other. In some embodiments, first sheet of filter media 634 and second sheet of filter media 636 may be attached to each other around an outer edge. For example, as shown in FIG. 6, first sheet of filter media 634 and second sheet of filter media 636 are in the shape of a rounded triangle. Here, first sheet of filter media 634 and second sheet of filter media 636 may be attached to each other around the outer edge of the rounded triangle shape. This allows the support structure of a filter attachment port to enter filter 600 at opening 642 and separate second sheet of filter media 636 from first sheet of filter media 634 by pressing against an interior surface of second sheet of filter media 636. Separating second sheet of filter media 636 from first sheet of filter media 634 increases the interior volume of filter 600, which decreases the filter media surface area to interior volume of filter 600. In some embodiments, first sheet of filter media 634 and second sheet of filter media 636 may also be attached another location (i.e., at an interior location not at an edge of the sheet). First sheet of filter media 634 and second sheet of filter media 636 may be attached by ultrasonically welding them together.

Opening 642 may be formed in one sheet of filter media. As shown, opening 642 is located within first sheet of filter media 634. Opening 642 is configured to receive the support structure of a filter attachment port of a face mask body. Opening 642 is shown in the shape of a circle, but may be an oval, triangle, square, rounded triangle, rounded square, etc.

In some embodiments, support ring 626 may be configured to attach to filter 600 at opening 642. Specifically, support ring 626 may be configured to attach to opening 642 at an outer rim of opening 642. For example, support ring 626 may be ultrasonically welded to a rim of opening 642. Support ring 626 may provide support for filter 600 and may be configured to connect filter 600 to a filter attachment port of a face mask body. In some embodiments, filter 600 may comprise two or more support rings 626. For example, a support ring 626 may also be located at an interior surface of second sheet of filter media 636 and may be configured to connect to a support structure of a filter attachment port.

Filter 600 may be manufactured by first punching out opening 642 from a sheet of filter media. Next, the punched sheet of filter media may be layered onto another sheet of filter media, and the outer shape of the two sheets of filter media may be punched out. The two sheets of filter media may be attached using ultrasonic welding. A support ring may be attached to the two sheets of media also using ultrasonic welding (e.g., at a rim of the punched opening).

Figure 7:
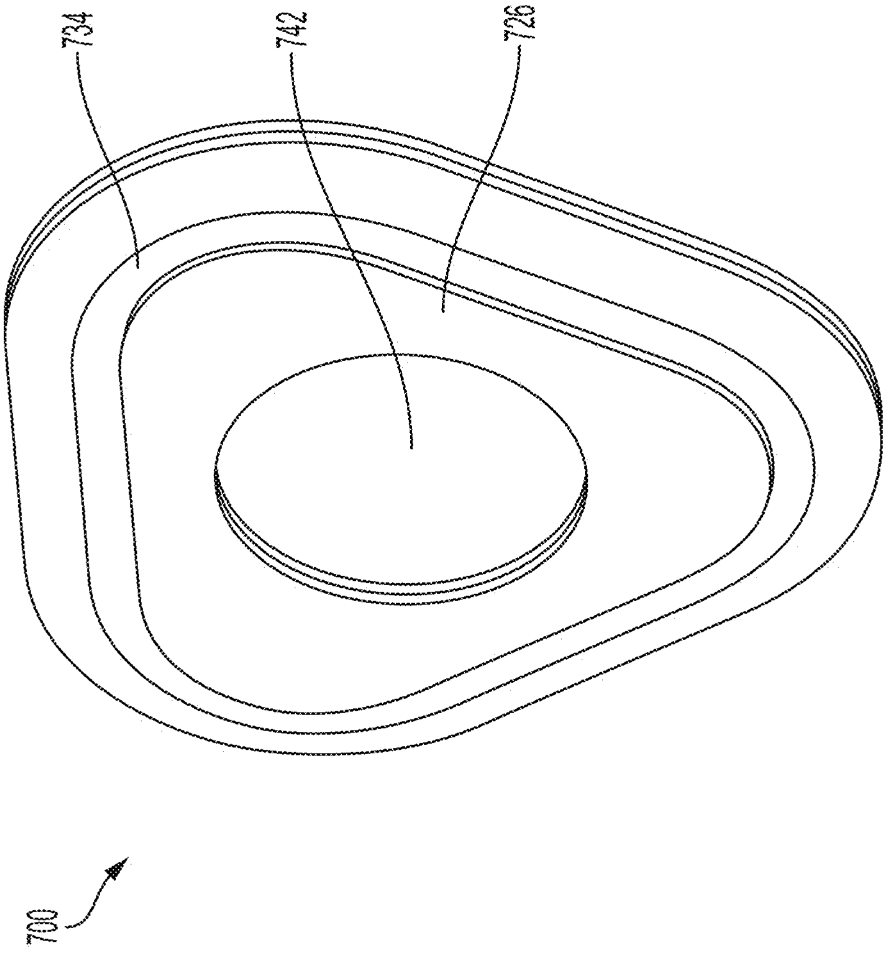
FIG. 7 shows a perspective view of a filter, according to some embodiments.

FIG. 7 shows a perspective view of a filter 700, according to some embodiments. FIG. 7 shows first sheet of filter media 734, opening 742, and support ring 726.

As described above, support ring 726 may be attached to first sheet of filter media 734. An opening in support ring 726 may correspond to opening 742 in first sheet of filter media 734. In some embodiments, support ring 726 is configured to attach to a filter attachment port of a reusable face mask body.

As shown, filter 700 is in a flat, or compressed, configuration. Filter 700 may assume this configuration when it is not attached to a reusable face mask body. This flat, or compressed configuration allows filter 700 to take up minimal space when stored and/or transported. Because filter 700 takes up minimal space when stored/transported, it lowers the cost of storage/transportation. Additionally, the minimal structure of filter 700 also lowers the cost of manufacturing.

When attached to a reusable face mask body, filter 700 assumes an open, expanded configuration. The support structure of a filter attachment port of a reusable face mask is configured to extend into filter 700 by way of opening 742, to provide structure to filter 700 and cause it to assume it's open, expanded configuration.

Figure 8:
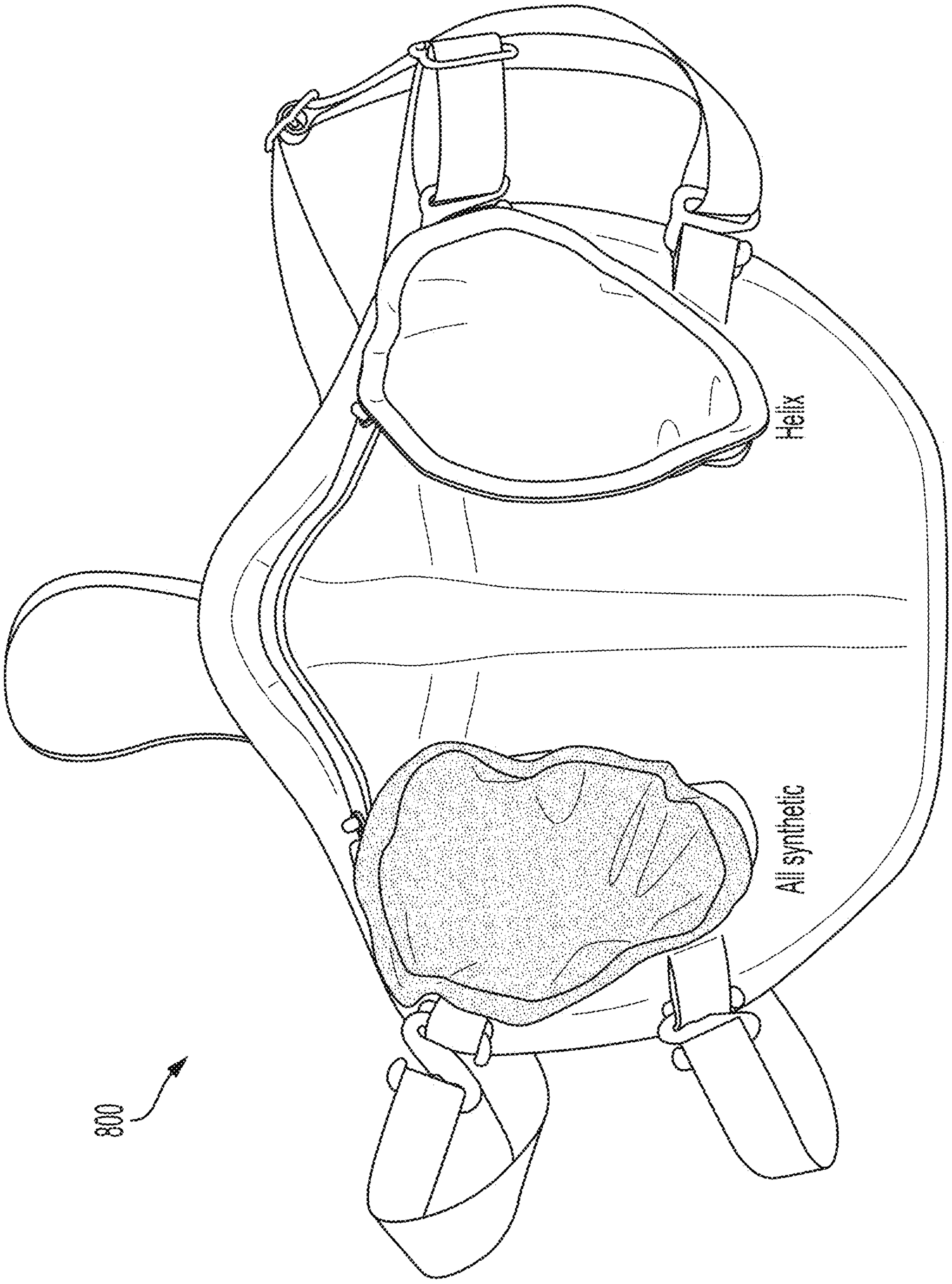
FIG. 8 shows an image of a reusable face mask comprising two different filters, according to some embodiments.

FIG. 8 shows an image of a reusable face mask 800, according to some embodiments. As shown, filter 800 includes two different filters. Filter 890 is a synthetic filter. A synthetic filter uses only spun bound polypropylene and/or melt-blown polypropylene. Filter 892 is a helix filter. A helix filter uses spun bound polypropylene, melt blown polypropylene, and wool.

Figure 9:
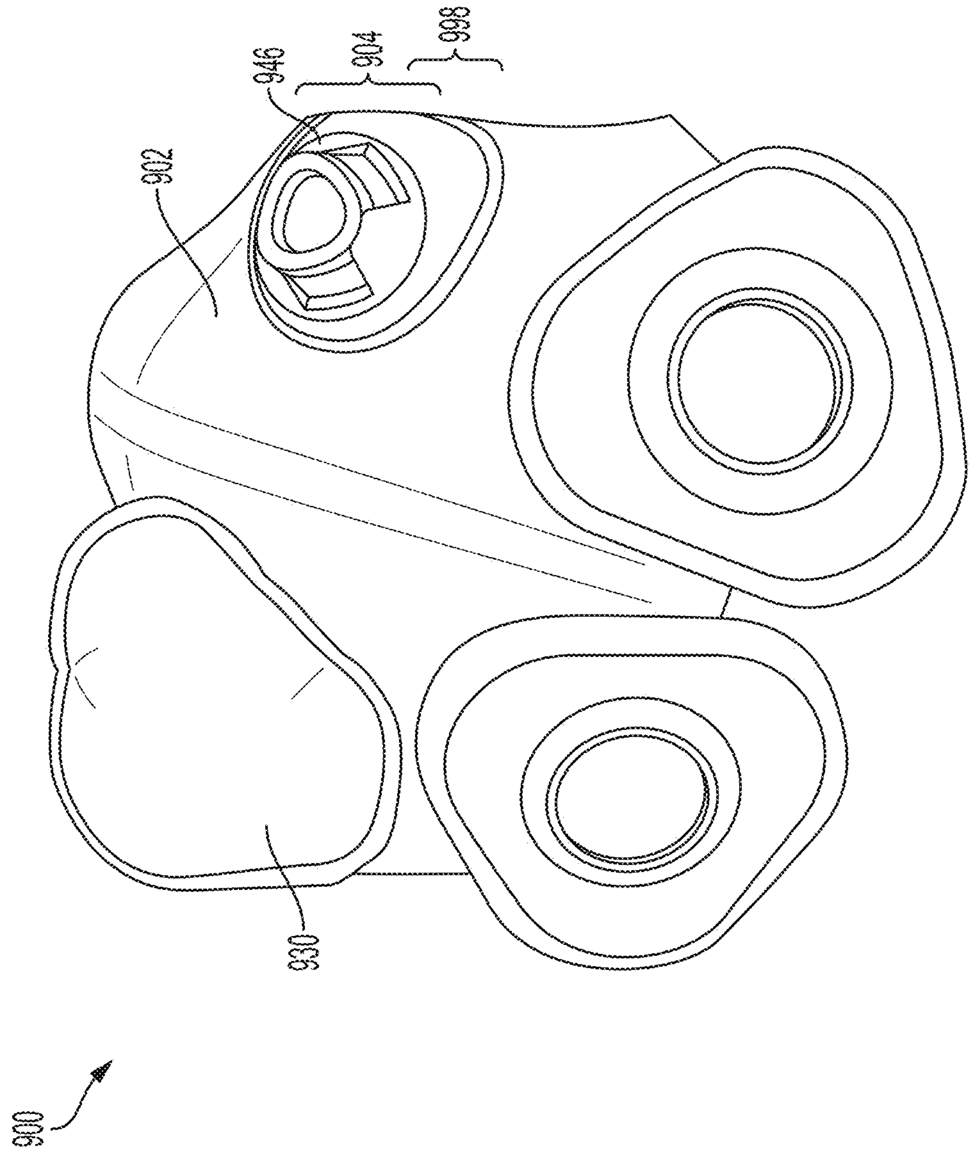
FIG. 9 shows an image of a reusable face mask and filters, according to some embodiments.

FIG. 9 shows an image of a reusable face mask 900, according to some embodiments. The image includes three filters 930. One filter 930 is attached to face mask body 902 and in its open, expanded configuration. Two filters 930 are not attached to face mask body 902 and are in their flat, compressed configuration. Face mask body 902 includes filter attachment port 904 comprising support structure 946.

In some embodiments, filter attachment port 904 may extend from a cavity 998 of face mask body 902. In some embodiments, cavity 998 may have a height (as measured along an outer edge of cavity 998, from the exterior surface of face mask body 902 to a lower edge of the proximal portion of filter attachment port 904) of 1-5 mm or 1-2 mm. In some embodiments, cavity 998 may have a height of less than or equal about 5, 4, 3, or 2 mm. In some embodiments, cavity 998 may have a height of greater than or equal to about 1, 2, 3, or 4 mm. In some embodiments, cavity 998 may have a width of 15-40 mm, 20-35 mm, or 25-30 mm. In some embodiments, cavity 998 may have a width of less than or equal to about 40, about 35, about 40, about 25, or about 20 mm. In some embodiments, cavity 998 may have a width of greater than or equal to about 15, about 20, about 25, about 30, or about 35 mm. In some embodiments, a total height of the filter attachment port 904 and cavity 998 may be about 5-15 mm or 10-12 mm. In some embodiments, the total height of filter attachment port 904 and cavity 998 may be less than or equal to about 15, 12, 10, or 8 mm. In some embodiments, the total height of filter attachment port 904 and cavity 998 may be greater than or equal to about 8, 10, 12, or 15 mm.

The foregoing description sets forth exemplary systems, methods, techniques, parameters, and the like. It should be recognized, however, that such description is not intended as a limitation on the scope of the present disclosure but is instead provided as a description of exemplary embodiments.

Although the description herein uses terms first, second, etc. to describe various elements, these elements should not be limited by the terms. These terms are only used to distinguish one element from another.

The articles "a" and "an" herein refer to one or to more than one (e.g. at least one) of the grammatical object. Any ranges cited herein are inclusive. The term "about" used throughout is used to describe and account for small fluctuations. For instance, "about" may mean the numeric value may be modified by ±0.05%, ±0.1%, ±0.2%, ±0.3%, ±0.4%, ±0.5%, ±1%, ±2%, ±3%, ±4%, ±5%, ±6%, ±7%, ±8%, ±9%, ±10% or more. All numeric values are modified by the term "about" whether or not explicitly indicated. Numeric values modified by the term "about" include the specific identified value. For example "about 5.0" includes 5.0.

The term "substantially" is similar to "about" in that the defined term may vary from for example by ±0.05%, ±0.1%, ±0.2%, ±0.3%, ±0.4%, ±0.5%, ±1%, ±2%, ±3%, ±4%, ±5%, ±6%, ±7%, ±8%, ±9%, ±10% or more of the definition; for example the term "substantially perpendicular" may mean the 90° perpendicular angle may mean "about 90°". The term "generally" may be equivalent to "substantially".

For any of the structural and functional characteristics described herein, methods of determining these characteristics are known in the art.

What is claimed is:

1. A reusable face mask comprising:

a single piece mask body configured to cover a nose and a mouth of a human face and comprising at least one filter attachment port, wherein the at least one filter attachment port defines a central opening in the mask body and extends from an exterior surface of the mask body;

a replaceable filter comprising a first sheet of filter media and a second sheet of filter media, wherein the first sheet comprises an opening and the first sheet is attached to the second sheet at an outer edge of the first and second sheets;

wherein the at least one filter attachment port is configured to connect to the replaceable filter and extend into the opening of the first sheet of the replaceable filter and press against an interior surface of the second sheet of the replaceable filter thereby separating a portion of the first sheet of filter media from a portion of the second sheet of filter media when the replaceable filter is attached to the at least one filter attachment port, wherein the at least one filter attachment port comprises a proximal portion adjacent the mask body, a distal portion attached to the proximal portion and extending away from the exterior surface of the mask body, and the central opening extending through the distal portion and the proximal portion, wherein the distal portion comprises a sidewall, the sidewall comprising a plurality of openings such that the plurality of openings are positioned within the replaceable filter between the first and second sheets of filter media.

2. The reusable face mask of claim 1, wherein the replaceable filter comprises a support ring and is configured to removeably attach to the at least one filter attachment port at the support ring.

3. The reusable face mask of claim 2, wherein the support ring is attached to a rim of the opening of the first sheet of filter media.

4. The reusable face mask of claim 2, wherein, when the replaceable filter is removably attached to the at least one filter attachment port, an inner surface of the support ring is in contact with a sidewall of the proximal portion of the at least one filter attachment port.

5. The reusable face mask of claim 2, wherein, when the replaceable filter is removably attached to the at least one filter attachment port, an airtight seal is formed between the support ring of the replaceable filter and a sidewall of the proximal portion of the at least one filter attachment port.

6. The reusable face mask of claim 2, wherein the support ring comprises one of polypropylene or polylactic acid.

7. The reusable face mask of claim 1, wherein the proximal portion and the distal portion are different shapes.

8. The reusable face mask of claim 1, wherein the proximal portion is cylindrical-shaped.

9. The reusable face mask of claim 1, wherein the distal portion is frustum-shaped.

10. The reusable face mask of claim 1, wherein a height of the distal portion is greater than a height of the proximal portion.

11. The reusable face mask of claim 1, wherein the distal portion is in a shape of a rounded triangle.

12. The reusable face mask of claim 1, wherein the distal portion extends past the proximal portion, such that an edge of the distal portion forms a ledge that extends radially from the proximal portion along a plane that is perpendicular to a height of the proximal portion and the distal portion.

13. The reusable face mask of claim 1, wherein the mask body comprises a transparent polymer.

14. The reusable face mask of claim 1, wherein the mask body comprises a polymer having a transmittance of 80% or greater.

15. The reusable face mask of claim 1, wherein the mask body comprises one of silicone or thermoplastic polyurethane.

16. The reusable face mask of claim 1, wherein the first sheet of filter media comprises a first layer of spunbond polypropylene, at least one layer of melt blown polypropylene, and a second layer of spunbond polypropylene.

17. The reusable face mask of claim 1, wherein the second sheet of filter media comprises a first layer of spunbond polypropylene, at least one layer of melt blown polypropylene, and a second layer of spunbond polypropylene.

18. The reusable face mask of claim 1, wherein the first sheet of filter media and the second sheet of filter media comprise a circular, square, rounded square, rectangle, rounded rectangle, triangle, rounded triangle, or oval shape.

19. The reusable face mask of claim 1, wherein the replaceable filter is an N95 filter.

* * * * *